United States Patent [19]

Roth

[11] Patent Number: 5,037,251
[45] Date of Patent: Aug. 6, 1991

[54] THREAD TAP

[76] Inventor: Alfred C. Roth, 2388 Yost Blvd., Ann Arbor, Mich. 48104

[21] Appl. No.: 328,370

[22] Filed: Mar. 24, 1989

[51] Int. Cl.⁵ .............................................. B23G 5/06
[52] U.S. Cl. ................................. 408/222; 408/226; 10/141 R
[58] Field of Search ............................ 408/215-222, 408/226, 239 R, 239 A, 240; 279/1 A; 10/141 R, 141 H, 140; 81/126

[56] References Cited

U.S. PATENT DOCUMENTS

| D. 46,716 | 12/1914 | Kemp . | |
|---|---|---|---|
| D. 58,502 | 7/1921 | Peck . | |
| D. 245,395 | 8/1977 | Cognevich | 279/1 A |
| 317,970 | 5/1985 | Cannon . | |
| 319,019 | 6/1985 | Peelman . | |
| 1,427,556 | 8/1922 | Shortell et al. . | |
| 2,335,741 | 11/1943 | Contaldi | 408/222 |
| 2,523,041 | 9/1950 | McKenzie | 81/436 |
| 3,136,347 | 6/1964 | Linquist . | |
| 3,265,343 | 8/1966 | Sanford, Jr. | 408/241 X |
| 3,355,752 | 12/1967 | Haralampiev et al. | 408/220 |
| 4,703,677 | 11/1987 | Rossini . | |

FOREIGN PATENT DOCUMENTS 247778  12/1947  Switzerland ......................... 408/226

OTHER PUBLICATIONS

Drilling Technology, S. F. Krar and J. W. Oswald, 1977, p. 127.

Primary Examiner—Larry I. Schwartz
Assistant Examiner—Robert Schultz
Attorney, Agent, or Firm—Dykema Gossett

[57] ABSTRACT

The present invention relates to an improved thread-tapping device which permits both conventional and non-conventional driving means to be used to drive the tap to form threads in a hole. The improved thread tap has a conventional set of flats arranged in a square configuration with each flat being spaced about the circumference of the shank at approximately 90 degrees with respect to one another. This first set of flats extends longitudinally at or about a free end of the shank of the thread tap in the direction of the cutting portion of the thread tap. Positioned between this first set and the cutting portion is a second mounting section which has a plurality of flats divisible by three. This second set of flats is circumferentially spaced about the shank of the thread tap and longitudinally extends from about the terminus of the first set in the direction of the cutting portion. The first set of flats is conventional and can be mounted within a conventional tap driving device. The second set of flats is arranged to receive and be clamped within a non-conventional tap driving device.

7 Claims, 1 Drawing Sheet

THREAD TAP

BACKGROUND OF THE INVENTION

The present invention relates to threading taps and more particularly to an improved shank which enables the thread tap to be used in for example a three-jaw chuck, a hexagon collet or six or twelve-point sockets and in standard thread tap holders.

Typical threading tape have a cutting section and a shank. The cutting section has cutting edges that cut threads into the wall of a hole as the tap is rotated. The shank has a hardened cylindrical body that ends in a square mounting portion for mounting the tap to a driving means such as a tap handle or tapping machine. The square mounting portion is on the free end of the shank so that a user can apply pressure to the tap with their free hand while rotating the tap handle with their other hand.

With a standard tap, a tap handle or tap machine must be used to engage the four flats of the square mounting portion. Tap handles and mounting fixtures on tapping machines are especially designed to receive the square mounting portion. For example, a tap handle has an open body with two cylindrical handles extending outwardly from opposite sides of the body. A pair of jaws are mounted within the open body. The position with respect to one another is controlled by rotating the tap handles. The square mounting portion of the shank can be positioned between the jaws and the jaws tightened against the square mounting portion to clamp the tap in the tap handle. The tap can then be positioned into a preformed hole and rotated by hand to cut interior threads in the hole.

Tap handles have several disadvantages. Their design makes them difficult to use in tight places because sufficient room is required to rotate the handle which requires an area having a diameter slightly larger than the length of the tap handle measured from handle tip to handle tip. In many applications, this amount of clearance space is not available. Further, threading holes with a tap handle is very slow and great care must be taken to ensure that threads are not crossed.

If mass production is required, a tapping machine must be used. As stated above, tapping machines have special mounting fixtures designed for holding the square mounting portion. There are a variety of holding devices with each designed to clamp onto the square portion at the extreme end of the tap shank while using the cylindrical portion to keep the tap aligned during rotation.

Although tapping machines are much quicker than tap handles, they do have disadvantages. They are not portable. Typically, jobs must be brought to the machine. Thus, any on-site threading of field applications require the use of a tap handle with its inherent restricts on use. Further, tapping machines are extremely expensive and very large, making them impractical for most uses other than mass production requirements.

Other mounting means, such as for example, three-jaw chucks commonly used with drill motors, hexagon collets and six or twelve-point sockets used with standard ratchet wrenches cannot be used to mount and adequately drive a standard tap. Three-jaw chucks and hexagon collets cannot engage the square shank so that the shank will be properly centered, and hardened steel jaws clamped on a hardened cylindrical shank tend to permit slipping under torquing conditions. Six or twelve-point ratchet sockets cannot adequately engage the shank and also tend to permit the tap to slip.

Although the mounting means would greatly enhance the applications and versatility of threading taps, they have generally been avoided because of their inherent disadvantages when used with threading taps.

SUMMARY OF THE INVENTION

The present invention overcomes the above disadvantages by providing a thread tap which has two sets of mounting surfaces. One set is the traditional square mounting surface and the other set has a plurality of flat surfaces with the number of flats being divisible by three. In this way, a standard driving means, such as for example a tap handle, can be used to rotate the tap or a non-standard driving means such as for example a three-jaw chuck, hexagon collet or ratchet wrench socket can be used for driving the thread tap. The two sets of mounting surfaces are positioned on the shank of the thread tap so that concentricity of the tap is maintained when the tap is being rotated.

The thread tap of this invention includes a thread cutting portion for cutting threads in the wall of a hole and a shank portion. The shank portion extends from the thread cutting portion and ends in a free end. The first set of mounting surfaces begins at or near the free end of the shank and extends longitudinally along the shank in the direction of the cutting portion. This first set is the traditional square mounting surface that has been the standard driving portion for thread taps prior to this invention. The second set of mounting surfaces is preferably positioned between the first set and the cutting portion of the thread tap. This second set has a plurality of flats divisible by three and preferably three or six flat surfaces, generally equally spaced about the circumference of the cylindrical shank. However, as should be appreciated, any number of flats equally divisible by three would work.

Due to the two sets of mounting flats, the tool is very versatile. Standard tap driving means can be used to drive the tap. More importantly, the second set of flats permits the tap to be driven by other non-conventional drive means such as for example a hand-held drill motor, and in particular a variable-speed, reversible hand-held drill motor. With variable speed, the thread tap can be started at low speed and high torque, and then the speed can be increased and torque reduced to finish the thread tap. By using a hand-held, reversible drill, the portability of a tap wrench and the speed of a tap machine are combined into a very efficient and effective tap tool.

A further advantage of the present invention is that the hand-held drill can be used in hard-to-reach tight places where the handle and tap machine cannot be used. This is also true of six or twelve-point ratchet sockets. The present invention is very beneficial to, for example, construction workers, maintenance workers, assembly and repair workers, who can not drill and tap holes quickly and in rapid succession. Further, the threads can be tapped with less physical effort than manual tapping.

Other advantages of the invention will become apparent from the following detailed description taken in connection with the accompanying drawings of which a brief description follows.

DETAILED DESCRIPTION OF THE INVENTION

Figure 1:
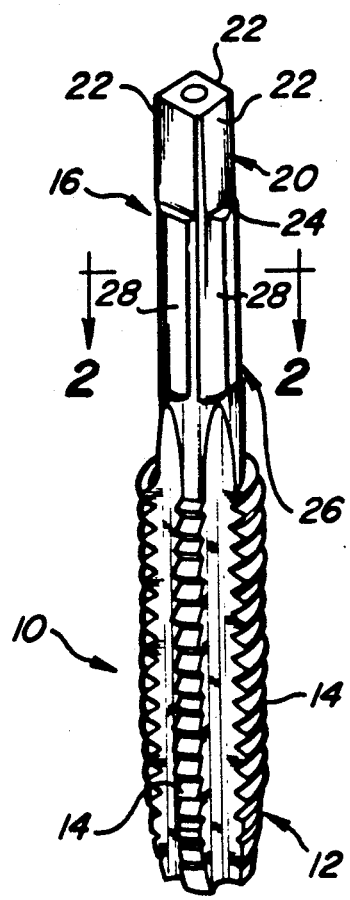
FIG. 1 is a perspective view of one embodiment of the modified threading tap of the present invention.

With reference to FIG. 1, the improved thread tap of the present invention is shown generally at 10. The thread tap has a cutting portion 12 which includes a plurality of cutting edges 14. These cutting edges are arranged in a conventional manner so that upon rotating the threading tap 10 about its longitudinal axis and pushing downwardly upon the tap in the direction of its longitudinal axis, threads can be cut on the inner wall of a preformed hole. As should be apparent, the cutting portion 12 and cutting edges 14 are shown by way of example only with it being understood that there are many variations of cutting portions for various functions. The cutting portion 12 illustrated is merely for purposes of example, and it is to be understood that the invention is not limited to this particular cutting portion but would be applicable to any cutting portion used on thread tapping tools.

Extending from the cutting portion 12 is a shank portion 16. This shank portion is configured to be mounted within a driving means, such as for example a conventional tap wrench handle or for unconventional driving means such as a hand-held drill motor or ratchet socket. The shank includes a first set of mounting surfaces indicated generally at 20. This first set includes four flats 22 each spaced at approximately 90 degrees with respect to one another. This first mounting set 20 is conventional and used on all thread taps known to Applicant. The four flats 22 are configured to fit within specially designed driving means, such as for example tap ratchet handles. Limit shoulder 24 extend from the lowermost portion of the flats 22 as viewed from the top of shank 16. Shoulders 24 prevent the tap wrench from sliding down shank 16 as pressure is applied to the tap wrench. As explained above, when starting any tap with a tap wrench, one hand is typically used to rotate the tap by turning the handle while, at the same time, the other hand is placed over the wrench center and the tap shank to provide downward force in order to get the tap started in the hole. To accommodate this, the square portion of the shank must be located at the end of the tap so that one's hand is not pressing against a shaft protruding beyond the wrench. Also, shoulders 24 prevent the tap wrench from sliding down the shank as downward pressure is applied.

A second set of mounting flats 26 is positioned between the first set 20 and the cutting portion 12 of thread tap 16. This second set of flats 26 has a plurality of flats which are divisible by three. In the embodiment illustrated in FIG. 1, there are six flats, with each flat being at 60 degrees with respect to an adjacent flat. This hexagonal arrangement of the flats is shown in the cutaway view illustrated in FIG. 2. The six flats permit the use of non-conventional driving means, such as three-jaw chucks, hexagonal collets and six or twelve-point wrench sockets, to be used to drive the tap. This ability with conventional thread taps. This is due to conventional thread taps not having an adequate place for these other types of drive means to be clamped onto the thread tap. If, for example, a hand-held drill having a three-jaw chuck were attached to conventional square flats, the tap would have a tendency to run eccentric as torque is applied. Still further, if the three-jaw chuck of a hand-held drill were mounted to the cylindrical shaft of the shank portion of a conventional thread tap, the hard steel of the shank and the hardened steel of the jaws would also permit slipping as torque is applied. Flats 28 of the present invention provide clamping surfaces for these non-conventional drive means.

Figure 2:
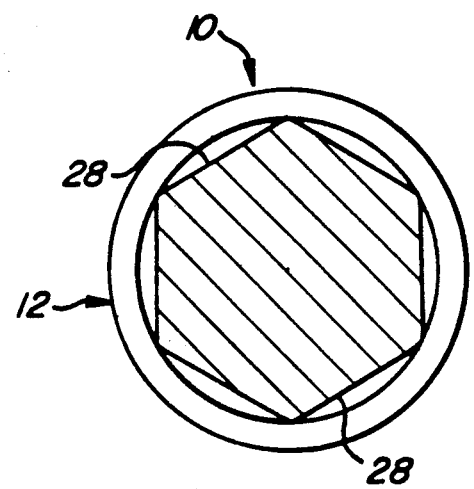
FIG. 2 is a cross-section taken along line 2—2 of FIG. 1.

With reference to FIG. 2, the hexagonal flats 28 are shown in relation to the cutting portion 12 of the thread tap 10. As can be seen, the positioning of the flats 28 permits concentric driving of the cutting portion in order to ensure proper thread formation.

Figure 3:
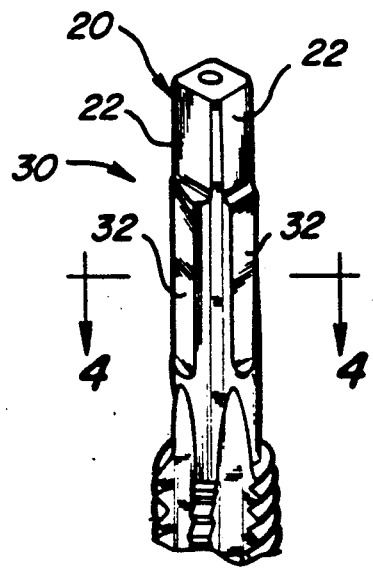
FIG. 3 is a partial perspective view of a second embodiment of the thread tap of the present invention.

With reference now to FIG. 3, a second embodiment of the present invention is illustrated generally at 30. This second embodiment includes elements which are identical to those elements discussed with respect to FIG. 1 and are identically numbered. The difference between the second embodiment and the first embodiment is in the number of flats. The second embodiment 30 has three flats, indicated at 32, with each flat being at approximately 120 degrees with respect to an adjacent flat.

Figure 4:
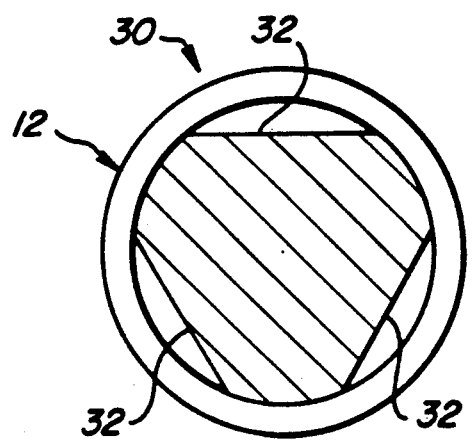
FIG. 4 is a cross-section taken along line 4—4 of FIG. 3.

With reference to FIG. 4, the configuration of the three-flat embodiment is shown, and the same concentric relationship between the flats and the cutting portion is illustrated.

Both embodiments of the present invention shown generally at 10 and 30 provide a versatile, easy-to-manufacture thread tap which permits a plurality of drive means to be used to drive the thread tap.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An improved tap for use in forming threads on the wall of a hole, said tap comprising:

a thread cutting portion for cutting threads along said wall as said tap is rotated about a longitudinal axis thereof; and a shank portion extending longitudinally from said thread cutting portion and ending in a free end, said shank portion having a first mounting section extending longitudinally from about said free end to between said free end and said thread cutting portion and a second mounting section positioned longitudinally between said first mounting section and said thread cutting portion;

said first mounting section having four mounting flats thereon with each flat being at approximately right angles to each adjacent flat;

said second mounting section having a plurality of flats thereon with each flat being at other than a right angle to each adjacent flat, said plurality of flats on said second mounting section being equally divisible by three;

whereby a conventional tap driving means is mountable to said first mounting section in a conventional manner and a non-conventional tap driving means is mountable to said second mounting section wherein said tap may be driven by a conventional or a non-conventional drive means depending upon the application.

2. The threading tap of claim 1, wherein said second mounting section has three flats thereon with each flat being at approximately 120 degrees with respect to an adjacent flat.

3. The threading tap of claim 1, wherein said second mounting section has six flats thereon with each flat being at approximately 60 degrees with respect to an adjacent flat.

4. A threading tap for forming threads on a wall of a hole, said tap comprising:
   a thread cutting portion extending along a longitudinal axis and a cylindrical shank extending longitudinally from said thread cutting portion;
   said shank having a first plurality of flat surfaces equally divisible by four and arranged to maintain concentricity of said tap as said tap is rotated; and
   a second plurality of flat surfaces thereon with said second plurality of surfaces being divisible equally by three and arranged to maintain concentricity of said tap during rotation of said tap;
   said shank has a longitudinal free end mountable within a holding means, said first plurality of flat surfaces being circumferentially spaced about said free end and longitudinally extending from said free end in the direction of said thread cutting portion with said second plurality of flat surfaces being positioned circumferentially about said shank and extending longitudinally from about said first plurality of flat surfaces to a position adjacent said thread cutting portion; and
   whereby said first plurality of flat surfaces is mountable within a first holding means having a plurality of holding surfaces divisible by four and said second plurality of flat surfaces is mountable within a second holding means having a plurality of holding surfaces divisible by three.

5. The tap of claim 4, wherein said second plurality of flat surfaces has three flats.

6. The tap of claim 4, wherein said second plurality of flat surfaces has six flats.

7. The tap of claim 4, wherein said first plurality of flat surfaces has four flats.

* * * * *